Dec. 16, 1924.
S. G. DOWN
1,519,120
BRAKE CONTROL FOR MOTOR VEHICLES
Filed April 20, 1921
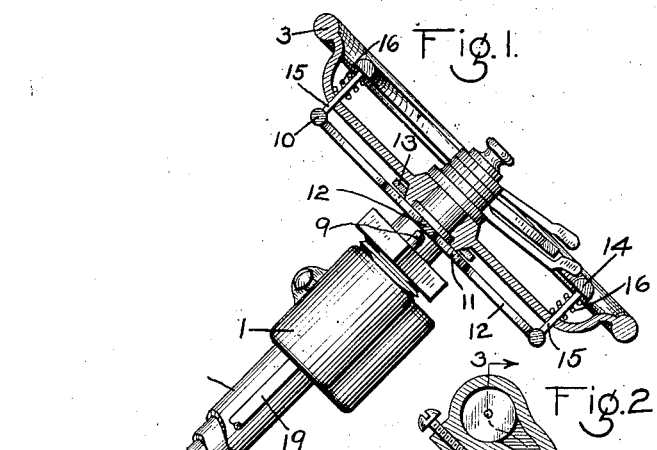
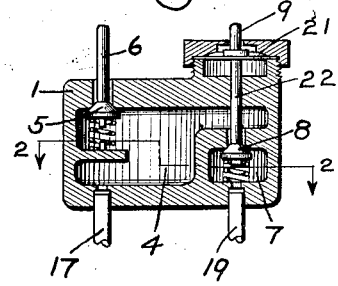
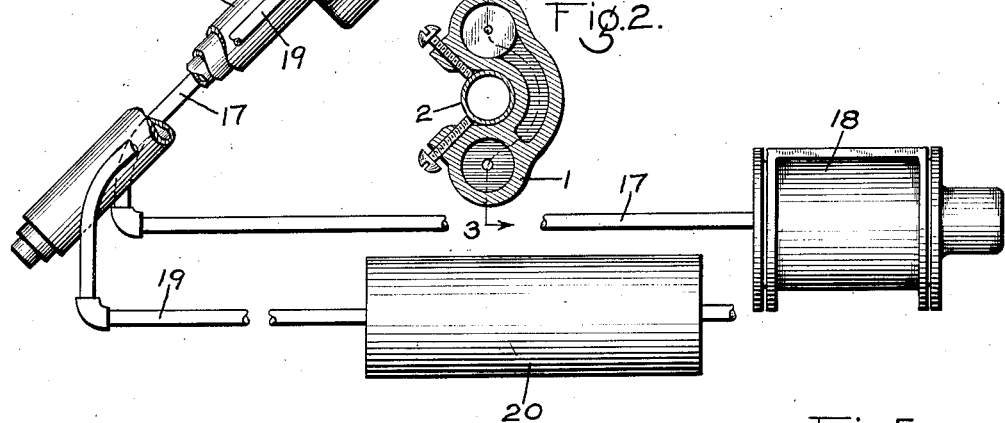
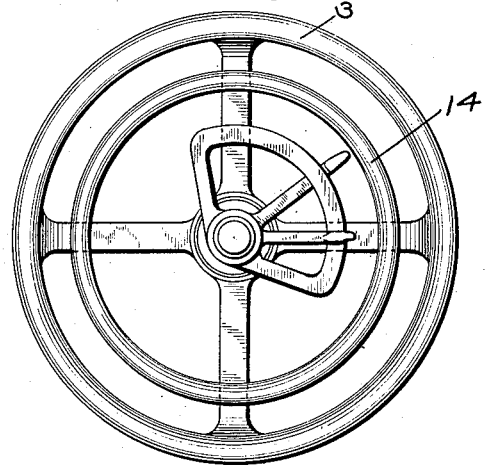
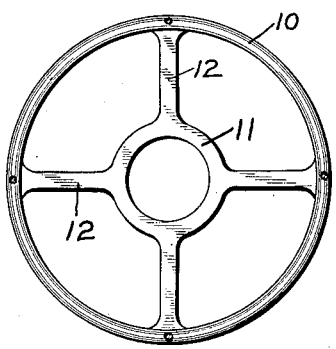
INVENTOR
SIDNEY G. DOWN
BY Wm. M. Cady
ATTORNEY Patented Dec. 16, 1924.

1,519,120

UNITED STATES PATENT OFFICE.

SIDNEY G. DOWN, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE CONTROL FOR MOTOR VEHICLES.

Application filed April 20, 1921. Serial No. 462,809.

*To all whom it may concern:*

Be it known that I, SIDNEY G. DOWN, a citizen of the United States, residing at Berkeley, in the county of Alameda and State of California, have invented new and useful Improvements in Brake Controls for Motor Vehicles, of which the following is a specification.

This invention relates to fluid pressure brakes, and more particularly to a brake controlling device for motor vehicles.

The principal object of my invention is to provide improved means for controlling the brakes at the steering wheel of the vehicle.

In the accompanying drawing; Fig. 1 is an elevational view of a motor vehicle brake apparatus embodying my invention; Fig. 2 a section on the line 2—2 of Fig. 3; Fig. 3 a section on the line 3—3 of Fig. 2; Fig. 4 a plan view of the steering wheel; and Fig. 5 a plan view of the finger control ring.

According to a preferred form of my invention, a valve casing 1 is secured to the steering post 2 of a motor vehicle adjacent to the steering wheel 3, and within said casing is a valve chamber 4 containing a valve 5 having a projecting stem 6. The casing also has a valve chamber 7 containing a valve 8 having a projecting stem 9, the valves 5 and 8, being arranged on opposite sides of the steering post 2.

Mounted below the steering wheel 3 is a member comprising an outer ring 10 connected to an inner ring 11 by spokes 12, the ring 11 being adapted when tilted to fulcrum on a ring 13, secured to the underside of the steering wheel hub, and engage one or the other of the valve stems 6 and 9.

Located concentrically of the rim of the steering wheel so as to be accessible to the fingers when the wheel is grasped is a finger ring 14, which is connected to the ring 10 by rods 15.

A coil spring 16 surrounds each rod 15 and bears against each spoke of the steering wheel, so that normally the ring 11 is pressed against the ring 13.

The valve chamber 4 is connected by a pipe 17 with a brake cylinder 18, the admission of fluid under pressure to which is adapted to apply the brakes on the vehicle. The valve chamber 7 is connected by a pipe 19 to a reservoir 20 which is normally charged with fluid under pressure.

The finger ring 14 is placed at a sufficient distance from the rim of the steering wheel so as not to interfere with the grasping of the wheel and yet permit of the ready manipulation of the ring 14 by the thumbs when desired.

In operation, when the operator wishes to apply the brakes on the vehicle, he depresses the ring 14 on the side adjacent to the valve stem 9, by means of the thumb, so that the inner ring 11 will fulcrum on the opposite side of the ring 13 and thereby cause a tilting of the ring 11, which then operates to open the valve 8 by depressing the stem 9. Fluid under pressure is then supplied from the reservoir 20 through pipe 19 and past the open valve 8 to valve chamber 4 and thence flows through pipe 17 to the brake cylinder 18 to apply the brakes, the release valve 5 being closed.

If it is desired to release the brakes, the ring 14 is depressed so as to cause the ring 11 to engage the valve stem 6. The depression of valve stem 6 opens the exhaust valve 5 so that fluid is vented from the brake cylinder 18 through pipe 17 to valve chamber 4 and thence past the open exhaust valve 5 to the atmosphere.

It will now be seen that by means of the above described construction, the brakes may be applied and released at will by the manipulation of the ring 14, without removing the hands from the steering wheel.

It will now be evident that the pressure in the brake cylinder may be gradually increased or decreased at any desired rate, according to the extent to which the ring 14 is depressed.

The stem 9 is preferably secured to a diaphragm 21, the actual stem 22 of the valve 8 engaging the under side of the diaphragm, so that a tight joint is secured without employing a stuffing box and at the same time the valve is easily movable by a slight application of pressure.

Having now described my invention, what I claim as new and desire to secure by Letters Patent, is:

1. The combination with a vehicle steering wheel, of a brake mechanism for controlling the application and release of the brakes on the vehicle and an annular member associated with said wheel for operating said mechanism to apply the brakes upon de pressing one portion and to release the brakes upon depressing another portion of said member.

2. The combination with a vehicle steering wheel and a fluid pressure brake for the vehicle including a brake application valve and a brake release valve, of a manually tiltable member associated with said steering wheel and adapted to operate the brake application valve upon depressing same at one point and the brake release valve upon depressing same at another point.

In testimony whereof I have hereunto set my hand.

SIDNEY G. DOWN.